INVENTOR.
HARRY V. MILES
BY Arnold Grout
ATTORNEY.

United States Patent Office 3,463,216
Patented Aug. 26, 1969

3,463,216
THERMAL SELF-SUSTAINING SYSTEM FOR SPENT PULPING LIQUORS
Harry V. Miles II, Westport, Conn., assignor to Dorr-Oliver Incorporated, Stamford, Conn., a corporation of Delaware
Filed Dec. 21, 1967, Ser. No. 692,601
Int. Cl. B01d 1/26
U.S. Cl. 159—47         6 Claims

ABSTRACT OF THE DISCLOSURE

A thermally self-sustaining system for the conversion of spent pulping liquors to new cooking liquor. The spent liquor is concentrated first in a multi-stage flash evaporator and then in a venturi type concentrator to a solids concentration that will burn autogenously. A combustion stage incinerates the organics and oxidizes the inorganics. The evaporation-concentration stages do not require the generation of steam, deriving all their heat from the off-gasses exiting from the combustion stage.

---

Figure 1:
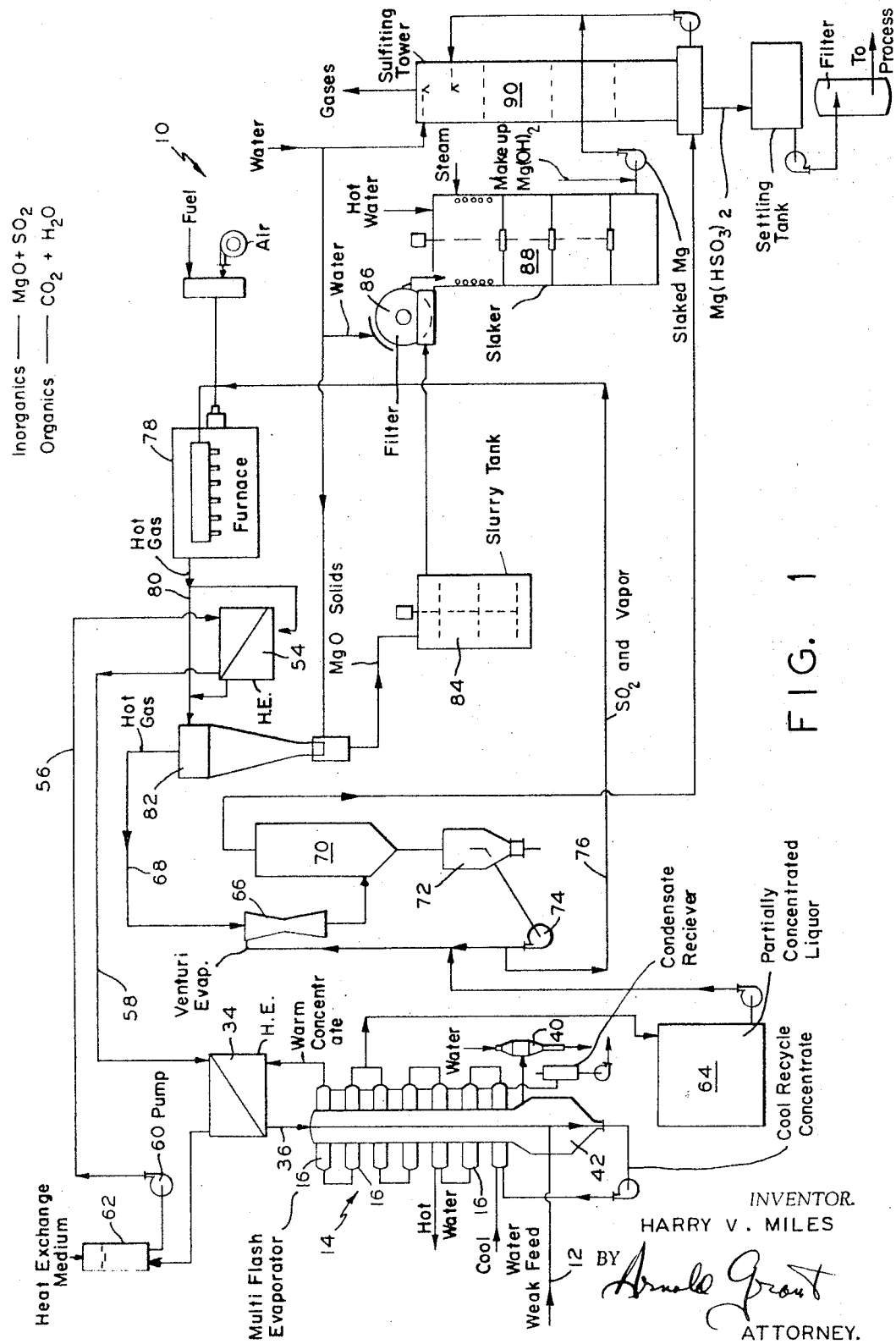

Heretofore, it has been considered common practice for sulfite pulp and paper mills to discharge their spent pulping liquor directly into receiving stream. Recently, however, a great deal of public and government attention has been focused on the deleterious effects which these pollutants have on our natural resources. As a result, a number of laws have been passed imposing stringent requirements on the quality and quantity of industrial by-products which may be discharged into receiving waters. If the present trend continues, the day will not be far off when industry will be barred from use of the rivers and lakes as a waste depository. The paper industry is, thus, faced with the problem of how to most economically and efficiently treat these wastes to either dispose of them or convert them into a useable product.

Systems for conversion of the spent pulping liquors into new cooking liquor, as is done in the kraft process, have been present in the art ever since the inception of the sulfite process. However, when these systems were evaluated on the basis of return on the capital investment required for conversion versus the cost of continuously purchasing new chemicals and dumping the spent liquor, the latter course of action was always the more economically favorable. Since these latter alternatives are, or soon will be, foreclosed by the enforcement of the new state codes, a number of these processes have been re-evaluated and several new ones suggested.

Basically, these processes involve some form of combustion of the organic constituents in the liquor and subsequent recovery of the inorganics either for reuse or ultimate disposal as a dry product. The majority of the processes utilize some type of recovery boiler for the combustion stage in conjunction with an evaporation system to concentrate the liquor to the point where the system will be thermally self-sustaining, i.e., no auxiliary fuel is required. A recovery boiler system, however, requires a substantial capital investment and, thus, can only be justified, from an economic standpoint, if, first, the cost of the steam generated in the boiler from the combustion of the liquor is less expensive than the cost of producing steam from available fuels; and, second, the paper making process can utilize the excess quantities of steam generated by the boiler and not required by the evaporation system. If it is cheaper to burn available fuels to generate steam and/or the paper making process already contains all the steam generating capacity presently required or needed in the foreseeable future, the capital investment for the recovery boiler cannot be justified and alternative approaches to liquor conversion or disposal must be utilized.

It is therefore an object of the present invention to overcome the above cited deficiencies in the prior art processes and provide a thermally self-sustaining recovery system which neither requires nor generates steam.

This object is attained by a novel system which employs a thermal reactor for the combustion step in conjunction with a multi-stage flash evaporator to concentrate the feed liquor to the autogenous combustion level. A multistage flash evaporator is, essentially, a group of individual pressure chambers, each of which is maintained at a serially decreasing pressure from one end of the evaporator to the other. The feed liquor is introduced to the chamber having the highest pressure and the combination of the pressure in the chamber and the temperature of the liquor interacts to flash a portion of the liquor. The liquor is then transferred to the next chamber where again the temperature of the cooled, concentrated liquor combines with the reduced pressure in the chamber to equate the sensible and latent heat and flash another portion of the liquor. In this manner the liquor is transferred from chamber to chamber and incrementally concentrated to the desired solids concentration without the necessity for the addition of extraneous heat between stages. Since no outside source of heat is required between the concentration stages, the thermal reactor used for the combustion of the organic constituents in the liquor does not require any elaborate steam generation or heat recovery equipment and a simpler, more compact unit can be used. On a comparative basis this system requires less than half the area of a recovery boiler system and costs approximately half as much.

It is therefore another object of the present invention to utilize a multi-stage flash evaporator as part of a recovery system to concentrate dilute spent pulping liquor.

It is yet another object of the present invention to draw all of the evaporator heat requirements for the concentration of spent pulping liquor from the combustion gases of the recovery system.

Figure 2:
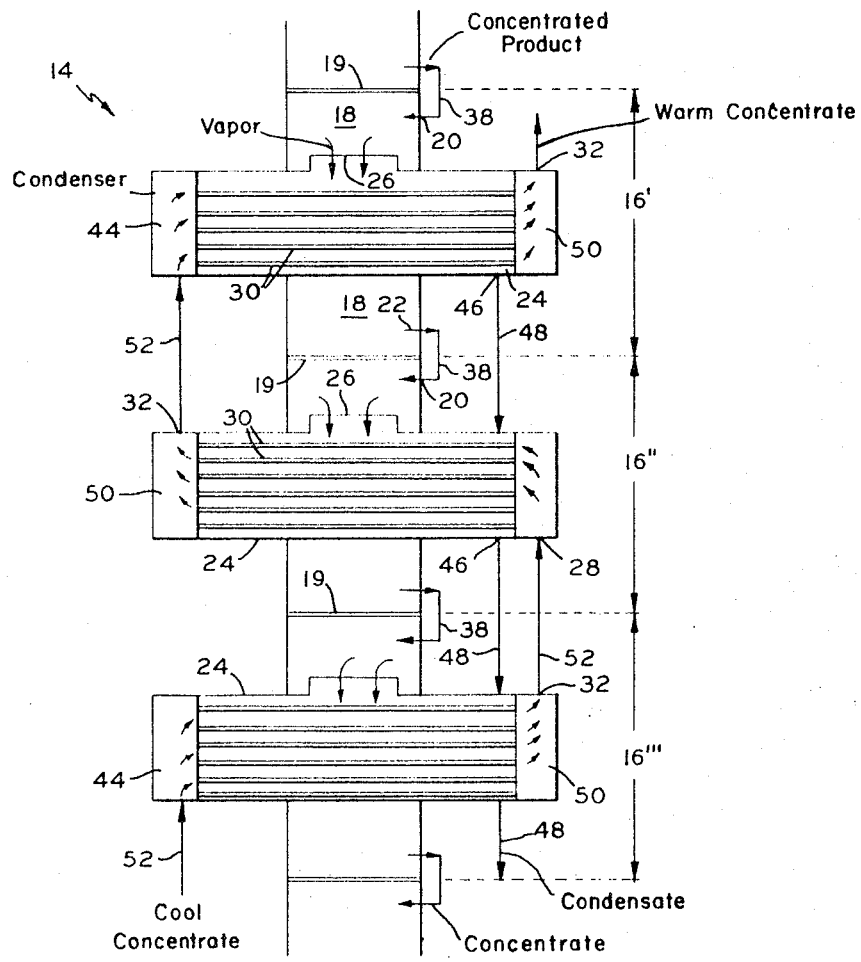

The subject matter which applicant regards as his invention is particularly pointed out and distinctly claimed in the concluding portion of this specification. The invention, however, as to its organization and method of operation together with other objects and advantages thereof will best be understood by reference to the following description taken in conjunction with the accompanying drawings, in which:

FIGURE 1 is a diagrammatic representation of a process flow sheet incorporating applicant's invention; and, FIGURE 2 is a diagrammatic representation of a type of multi-stage flash evaporator which can be used in the process incorporating applicant's invention.

Referring now to the drawings, the recovery system 10 will be described in detail for the conversion of magnesium ligno-sulfonates to the base chemicals magnesium oxide and sulfur dioxide, and the reconstituting of these chemicals into the cooking liquor, magnesium bisulfite. It should be understood, however, that the process is equally as applicable to the treatment of other types of spent pulping liquor.

The weak liquor, resulting from the separation of the cellulose fibers from their lignin binder and containing approximately 10–12 percent solids, is fed through conduit 12 into the first step of the liquor evaporation-concentration stage of the process 10. Conceptually, a thermally self-sustaining liquor combustion system requires that heat from the combustion stage supply the heat energy necessary for the evaporation-concentration of the liquor. In order for the liquor to burn autogenously, i.e., without the aid of an extraneous fuel, the solids concentration in the weak liquor (10–12%) must be increased to 40% or more, depending upon the heat content of the dissolved solids. Since the available heat in the liquor solids is insufficient to evaporate the required quantity of water on a 1:1 basis, i.e., one pound of steam per one pound of water, heat economy becomes necessary. While a conventional multi-effect type evaporator may be employed to provide this heat economy, it requires steam, which, in a thermally self-sustaining system, would have to be supplied by a waste heat boiler downstream from the combustion stage. This, however, represents a major capital expenditure which can only be justified if, first, the cost of the steam generated by burning the liquor is less expensive than steam generated from the combustion of available fuels; and, second, the paper making process can utilize the excess steam not required by the evaporation-concentration stage. If these criteria of steam utilization and fuel economy are not met the investment required for a waste heat system cannot be justified and an alternative approach must be found for the evaporation-concentration of the liquor.

The problem then is to perform the evaporation-concentration step by using the heat in the off-gases generated by the combustion stage without the need for the intermediate step of producing steam. As shown in FIGURE 1, a multi-stage flash evaporator is well suited to this task; first, because it does not require the intermediate step of generating steam from the heat in the off-gases to perform the evaporation; second, because, as will presently be explained, all of the heat supplied to the liquor is under non-boiling conditions at relatively high velocities; and third, because its unique construction obviates the scale formation problem which is so critical in the concentration of spent pulping liquors. In a multi-stage flash evaporator, the liquor is heated only once, by a suitable heat exchanger, and then passed through a succession of chambers at correspondingly lower pressures. Vapors flash in each chamber in response to the pressure maintained in the chamber. Thus, the liquor does not have to be reheated to the boiling temperature after each flashing, as is the case in a multi-effect type evaporator. Flashed vapors are liquified in a separate condenser containing the necessary heat transfer surfaces, with the condensing medium being the cooled concentrated liquor that is continuously being recirculated from the last stage of the unit through the series of condensers. In this manner the latent heat, from the condensing vapors, is retained in the system and the heat transfer requirements for the heat exchanger are correspondingly reduced.

The first or multi-stage flash evaporator 14 shown in the drawings, by way of example only, it being understood that there are many types of multi-stage flash evaporators applicable in this environment, consists of a vertical tower having a series of sub-stages 16, stacked one above the other. Each sub-stage consists of cylindrical, vertically elongated, flash chamber 18, having end plates 19, a feed inlet 20 and a concentrated product outlet 22; and a cylindrical horizontally elongated condensation chamber 24, interposed between the end plates 19 of the flash chamber and having a vapor inlet 26, a cooling liquor inlet 28, a bundle of condensation tubes 30 and a product outlet 32. Liquor is heated to its highest temperature, preferably around 270° F., in a heat exchanger 34, to be described in greater detail below, and flows through conduit 36 into the flash chamber in the uppermost sub-stage 16′ (FIGURE 2) of the tower. The pressure in this sub-stage is the highest in the tower; the pressure being incrementally decreased from flash chamber to flash chamber from the top to the bottom of the tower. Liquor being concentrated flows from flash chamber to flash chamber through conduits 38 having suitably sized orifices (not shown) to control the quantity of liquor in each of the successive sub-stages.

The pressure in the flash chamber of uppermost sub-stage 16′ is chosen to flash a predetermined portion of the incoming liquor. As the vapors flash, the liquor temperature decreases by the amount equal to the latent heat of the vapors. The pressure in the flash chamber of sub-stage 16″, immediately proceeding sub-stage 16′, is maintained at a level below that in sub-stage 16′, to take into account the lower temperature of the liquor, which then flashes another predetermined portion of the liquor. As the liquor descends between sub-stages, through conduits 38, the corresponding decrease in temperature of the liquor is matched by a corresponding decrease in the pressure to incrementally concentrate the liquor to the desired solids concentration. By employing a vacuum in the lowermost sub-stage of the tower the liquor temperature can be reduced to as low as 130° F. The vacuum for this chamber can be achieved by a barometric condenser 40, which also serves to remove the non-condensed gases from the flash chamber of the lowermost sub-stage.

Feed liquor, from conduit 12, is introduced into a reservoir 42, which is positioned below the lowermost sub-stage of the tower to receive the cooled concentrated liquor, preferably in a ratio of one part weak liquor to three parts concentrated liquor and this mixture is used as the condensing medium in the condensers 24. Vapors flashed in a chamber 18 enter the corresponding condenser 24 through inlet 26. Cooler, condensing medium, from the preceding sub-stage, is pumped through inlet 28 into header 44 and through the tube bundle 30. The vapors condense on the tube bundle and are discharged through outlet 46 into conduit 48. In this manner, the recirculated condensing medium absorbs the latent heat given up by the vapors thereby retaining this heat in the system. The condensing medium is then discharged from the tube bundle 30 into collector 50 and conduit 52 for transfer to the next condenser. As denoted by the arrows on conduits 38 and 52 the liquor descends from sub-stage to sub-stage being successively cooled and concentrated, while the condensing medium ascends from sub-stage to sub-stage, countercurrently to the liquor, being incrementally heated by adsorbtion of the latent heat from the condensing vapors. When the condensing liquor leaves the condenser of the uppermost sub-stage it will have been reheated to over 200° F., the amount of reheat being a function of the desired heat economy of this tower. For example at 3 to 1 heat economy, the recirculating liquor enters the reservoir 42 at approximately 130° F. and leaves the uppermost condenser at approximately 220° F. Therefore, to achieve the necessary evaporation it is only necessary to heat this recirculating stream from 220° F. to 270° F.

In the recovery boiler multi-effect evaporation systems, discussed above, the heating of the liquor, prior to its introduction to the evaporator, and intermediate each flashing stage, is performed by steam, generated from the combustion stage off-gases. As was stated above, such a system is economically justifiable only if from a capital investment standpoint it is less expensive to generate steam by combustion of liquor than with other available fuels and some uses can be found for the excess steam generated in the recovery boiler and not required by the evaporation stage. If these criteria cannot be met, a recovery boiler based system cannot be economically justified and some other forms of evaporation concentration must be used. Even though a multi-stage flash evaporation system requires only a minimum of extraneous heat, i.e., the liquor must be raised only once, from 220° F. to 270° F., the fact still remains that if steam generation cannot be justified with a recovery boiler based system, it also cannot be justified for a multi-stage flash evaporator. The problem then was to provide the heat required by the multi-stage flash evaporation without the intermediate step of producing steam.

As shown in FIGURE 1, this problem has been solved by utilizing the heat in the combustion stage off-gases. A heat exchange system, comprising a first exchanger 54, a second exchanger 34 and a pair of interconnecting conduits 56, 58 constantly circulate a fluid heat exchange medium. A pump 60 and an expansion chamber 62 moves the fluid medium from second exchanger 34 through conduit 56 to first exchanger 54 to receive the heat from the off-gases. The heated fluid medium then travels through conduit 58 to discharge the heat back into second exchanger 34, thereby bringing the liquor up to the desired temperature. It will be noted that this heat exchange procedure is performed without the generation of steam and thus without the necessity of an expensive heat recovery system.

In any one pass through the tower, the concentration of the solids in the liquor is only incrementally increased. However, by successively recirculating the liquor the concentration can be increased to the desired level. Thus the question becomes, first, where to remove the concentrated product, and then, second, how much concentration will be done in the tower. Optimumly, the answer to the first question is at a point where the temperature of the liquor is below the boiling point, to prevent flashing, but above the temperature required for further treatment, so that the liquor will not have to be reheated. In the exemplary flow-sheet of FIGURE 1, the liquor is approximately at this temperature between the second and third sub-stages of the tower, and the liquor is, thus removed from both of these sub-stages.

The answer to the second question is more difficult, entailing an analysis of the particular feed material and the requirements of the system. Heretofore, whenever a multi-stage flash evaporator was used for the concentration of a liquor, all, or practically all, of the evaporation was performed in the tower. Applicant has found, however, that even though a multi-stage flash evaporator is extremely efficient, it does reach a point of diminishing returns when it is used to concentrate spent pulping liquors. The prior art has, to an extent, solved this problem by the inclusion of additional sub-stages on the tower. It is not uncommon to find units having as many as many as 20-50 sub-stages in the tower. This, however, has an inordinate effect on the original cost of the unit which is unwarranted, when measured against the increased concentrating capacity of the tower. That is, while the inclusion of additional sub-stages has enabled the tower to concentrate a liquor from 10-50% solids in a shorter period of time, the additional cost is unwarranted when measured against the time differential.

Applicant's approach to the problem was, at what point, i.e., at how many sub-stages and at what solids concentration, does diminishing efficiency occur, and what alternatives can be used for concentrating the remaining liquor to the above 40% solids level. Experimentation has disclosed that when concentrating spent pulping liquor, diminishing returns first occurs between seven and ten sub-stages, and that at eleven to fifteen sub-stages the reduced efficiency is readily apparent. Further experimentation revealed that with less than ten stages optimum concentrating efficiency was realized when the spent liquor contained 25-35% solids. Thus, the second stage of the evaporation-concentration system would have to raise the solids concentration from 25-35% to over 40%. As a further complication the second stage of the evaporation-concentration system must not require steam and any heat necessary for its operation must be inherent in the system.

As shown in the exemplary flowsheet of FIGURE 1, applicant's solution is, first, a tower having seven concentration sub-stages; second, removal of the liquor at approximately 25-35% solids, and third, transfer of the liquor through an intermediate storage vessel 64 to a venturi-type evaporator 66. Hot gases from conduit 68 enter the venturi and are intimately mixed with the liquor. The constriction in the venturi creates a pressure drop which atomizes the liquor to the point where it can be readily evaporated and absorbed by the hot gases. An entrainment separator 70 is positioned down stream from the venturi to receive the concentrated product and separate the liquor from the gases. A portion of the concentrated product is recycled, through tank 72 and pump 74, back to the venturi, and the remainder, now having a solids content on the order of 45-55%, is transferred through conduit 76 to the combustion stage of the process.

The combustion stage preferably comprises furnace 78 such as shown and described in U.S. Patent No. 2,678,615. In the reactor the organic constituents of the liquor are incinerated to carbon dioxide and water and the inorganics oxidized to magnesium oxide and sulfur dioxide. A conduit 80 receives the hot off-gases from the reactor; a portion being funneled through heat exchanger 54 and the remainder being transferred to hot cyclone 82. The cyclone separates the solids, discharging them as underflow, while the overflow gases are transferred through conduit 68 to the venturi evaporator. Thus, it will be noted that all of the heat requirements of the evaporation-concentration system are generated internally, i.e., from the combustion stage off-gases, making it thermally self-sustaining without the generation of steam. It should also be noted that this evaporation-concentration system is able to convert the same quantity of dilute magnesium lignosulfonates to the same quantity of magnesium oxide and sulfur dioxide as a recovery boiler-multi-effect evaporator system, but at approximately half the capital cost and in less than half the working space.

The solid magnesium oxide particles are transferred from the cyclone underflow, through a slurry tank 84, and a filter 86, to a slaker 88. A small amount of steam, which may be channeled from the pulping process is then added to convert the magnesium oxide particles to slaked magnesium oxide. The slaked product is then pumped to a sulfiting tower 90 where it is contacted with the sulfur dioxide, generated in the reactor 78, and transferred through the heat exchanger and venturi, to form the new cooking liquor, magnesium bisulfite.

I claim:
1. A process for the treatment of spent liquors resulting from chemical digestion operations and containing organic and inorganic solids in a substantially dissolved state comprising:
  (a) introducing the liquor to the first stage of a plural stage evaporation-concentration system, the first stage comprising:
    (i) between 2 and 10 pressurized flash chambers, each flash chamber being at a different pressure, the flash chambers being arranged in a serially decreasing order of pressure from one end to the other end, each flash chamber being in hydraulic communication with the flash chambers on either side thereof to receive feed from the flash chamber having a higher pressure and to discharge to a flash chamber having a lower pressure, the flash chamber having the highest pressure receiving feed from a heat exchanger;
    (ii) a corresponding number of condensing chambers, one for each flash chamber, each of the condensing chambers having an opening therein to receive vapors flashed in the corresponding flash chamber and to condense the vapors, the condensing chambers having means therein to pass a condensing medium therethrough to condense the vapors and absorb the latent heat from the condensing vapors, each condensing chamber being in hydraulic communication with the condensing chamber on either side thereof, receiving the condensing medium to a warmer condensing chamber, the condensing chamber having the highest temperature discharging the condensing medium to the heat exchanger which feeds the flash chamber having the highest pressure, the condensing chamber having the lowest temperature receiving the condensing medium;

(b) utilizing the feed liquor as indirect condensing medium and transferring the said liquor from the condensing chamber having the lowest temperature successively and progressively to the other condensing chambers to absorb the latent heat from their condensing vapors;

(c) discharging the heated condensing medium from the condensing chamber having the highest temperature to a heat exchanger to further heat the liquor;

(d) transferring the heated liquor from the heat exchanger to the flash chamber having the highest pressure, and flashing at least a portion of the liquor therein;

(e) concentrating the liquor by serially transferring it from the flash chamber having the highest pressure to the flash chamber having the lowest pressure and flashing at least a portion of the liquor in each flash chamber and condensing the flash vapors in their corresponding condensing chambers;

(f) transferring at least a portion of the thus concentrated liquor from the lowest pressure flash chamber to the feed liquor side of the corresponding condensing chamber there to join with the liquor being introduced to the system;

(g) removing at least a portion of the said concentrated liquor from one of the sub-stages of the first stage of the evaporation-concentration system and transferring it to the second stage of the system for completion of the evaporation-concentration, said second stage comprising a direct contact venturi type evaporator;

(h) transferring a portion of the resulting concentrated liquor to a thermal reactor and recycling the remainder to said venturi evaporator, combusting the organic constituents of the transferred liquor and oxidizing its inorganic constituents;

(i) transferring the reactor thermal products to a separator to disassociate the solid and gaseous components of the thermal products; and (j) utilizing all of the gaseous component of the thermal products as the evaporative heating medium in the direct contact second stage of the evaporation-concentration system and to supply at least a portion only of its heat to the heat exchanger of the first stage of the evaporation-concentration system.

2. A process as defined in claim 1 wherein the concentrated liquor is concentrated to the desired solids concentration in the second stage of the evaporation-concentration system by being intimately mixed with the gaseous component of the thermal products and atomized by being passed from a relatively wide space through a relatively constricted space.

3. A process as defined in claim 2 wherein the solids concentration of the liquor introduced to the first stage of the evaporation-concentration system is between 8–15% and the solids concentration of the concentrated liquor transferred to the second stage is between 20–35%.

4. A process as defined in claim 2 wherein the product of the first stage of said evaporation-concentration system has a solids concentration between 20–35% and the product of the second stage has a solids concentration between 40–55%.

5. A process as defined in claim 3 wherein the temperature of the liquor introduced to the first stage of the evaporation-concentration system is between 150–200° F. and the temperature of the concentrated liquor cycled from the flash chamber having the lowest pressure to its corresponding condensation chamber is between 110–150° F.

6. A process as defined in claim 5 wherein the temperature of the liquor transferred from the condensing chamber having the highest temperature to the heat exchanger is between 175–240° F. and the temperature of the liquor transferred from the heat exchanger to the flash chamber having the highest pressure is between 250–300° F.

References Cited

UNITED STATES PATENTS

| | | | |
|---|---|---|---|
| 3,153,609 | 10/1964 | Markant et al. | 162—36 |
| 3,183,145 | 5/1965 | Collins | 162—47 |
| 3,212,235 | 10/1965 | Markant. | |
| 3,304,242 | 2/1967 | Lockman | 159—18 X |

NORMAN YUDKOFF, Primary Examiner

J. SOFER, Assistant Examiner

U.S. Cl. X.R.

159—4, 16, 17, 18, 46; 202—174